C. ABRAHAMS.
DEPTH OR LIQUID LEVEL GAUGE.
APPLICATION FILED JAN. 21, 1921.

1,428,576.

Patented Sept. 12, 1922.

WITNESSES:

INVENTOR:
Charles Abrahams
BY

ATTORNEY

Patented Sept. 12, 1922.

1,428,576

UNITED STATES PATENT OFFICE.

CHARLES ABRAHAMS, OF BROOKLYN, NEW YORK, ASSIGNOR TO JACOB ABRAHAMS, OF NEW YORK, N. Y.

DEPTH OR LIQUID-LEVEL GAUGE.

Application filed January 21, 1921. Serial No. 439,042.

*To all whom it may concern:*

Be it known that I, CHARLES ABRAHAMS, a citizen of the United States, residing at Brooklyn, in the county of Kings and State of New York, have invented a new and useful Improvement in Depth or Liquid-Level Gauges, of which the following is a specification.

The present invention refers to a depth or liquid level gauge for liquid supply on moving vehicles or vessels of that kind where the difference in pressure of two liquid columns, viz., the liquid supply and a constant level column, forms means for actuating an indicating mechanism. Such a gauge is shown and described in Letters Patent of the United States No. 1361576, dated December 7, 1920, granted to Andersson Gasometer Co., Inc., as assignee of Ivan Andersson. In the gauge as shown in Figure 1 of that patent, there was no provision for compensating for losses of liquid in the constant level column due, for example, to the spilling of the liquid from the top of that column or to evaporation. It was found in practice that the change of level due to such losses was sometimes sufficient to affect unfavorably the accuracy of the gauge.

The object of this invention is to provide means whereby any loss of liquid in the constant level chamber is compensated for.

For this purpose I provide a pump consisting of a pumpbarrel and a piston, the latter being caused to oscillate up and down through the movements of the vehicle or vessel, or to and fro through the centrifugal force when the vehicle or vessel takes a curve or through the lateral force when the vehicle or vessel oscillates laterally. In accordance with this invention the pump is incorporated with the gauge, the intake of the pump communicating with the liquid supply, and the outlet with the constant level chamber, which is provided with a top cover with overflow openings, whereby a constant level is maintained no matter how much liquid is pumped into the chamber.

A spring may be arranged on one side of the piston, which after having been compressed by the movement of the piston, will react and move the piston in the opposite direction and thereby force the liquid up through the tube into the constant level chamber.

The invention is illustrated in the accompanying drawing where—

Figure 4 is a cross sectional view of the diaphragm type pressure gauge 1.

Figure 1:
Fig. 1 is a diagrammatic view illustrating the application of the invention to a liquid level gauge.
Figure 1:
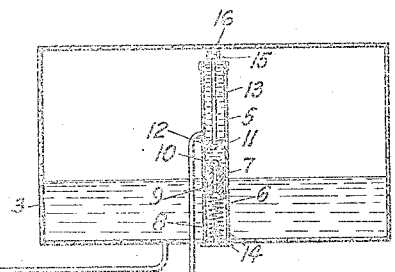

1 is the indicator portion of the gauge consisting of the two chambers A and B separated by the elastic wall C, which is connected to a lever D and operates an indicating mechanism of any usual construction, such as a pointer E arranged to be operated by means of a cord F, connected to a bell crank lever G, the particular operating mechanism forming no part of my present invention. The chambers are respectively connected by the tubes 2 and 4 to the liquid supply tank 3 in which is contained the liquid the level of which is to be indicated, such as the gasoline tank of an automobile, and the constant level chamber 5 in which, for the proper operation of the gauge, the liquid must be maintained at a constant level. The lower part of the constant level chamber forms or has directly connected therewith the pumpbarrel 6 in which works the piston 7 resting on the top of the helical spring 8. The piston 7 is provided with the passage 9 closed at the top by the ball valve 10. The space above the piston 7 communicates with the upper part of the constant level chamber 5 by the passage 11 through the constant level chamber bottom 12 and the tube 13. The pump barrel 6 is provided with inlet holes 14 at the lower end. On sudden up and down movements of the vehicle or vessel, the piston 7 by reason of its own inertia will oscillate with respect to the barrel, and moving downwards will compress the spring 8. At the same time liquid will be forced up through the passage 9, lift the ball valve 10 and flow into the space above the piston. From here it will be forced up through the passage 11 and the tube 13 into the constant level chamber on the return stroke of the piston. Superfluous liquid, that is, liquid in excess of that required to compensate for liquid lost by evaporation and otherwise will overflow through the holes 15 in the cover 16 of the constant level chamber and returns to the main supply in the tank 3. The liquid in the chamber 5 will therefore be maintained at a constant level and the gauge will function accurately at all times.

Figure 2:
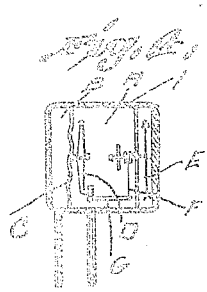
Figs. 2 and 3 are similar views of modified embodiments of the invention.
Figure 2:
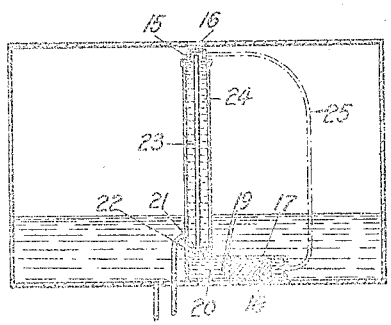

In Fig. 2 the pump barrel 17 and piston 18 are placed more or less horizontal and in such a position on the vessel that in the movement of the vessel or vehicle in a curve the centrifugal force will move the piston in one or the other direction, as will the lateral movement when the vessel or vehicle lurches or oscillates sidewise, drawing in liquid into the pump barrel 17 and subsequently press up the liquid into the constant level chamber. For instance, when the piston is moved to the right in Fig. 2 the liquid will flow through the openings 19 and fill the space 20 in front of the piston, and when moved to the left will press the liquid up through the passage 21 in the constant level chamber bottom 22 and the tube 23 into the constant level chamber 24. The pump may be double acting and a connection 25 made from the other end of the pump barrel to the constant level chamber as shown in dotted lines.

Figure 3:
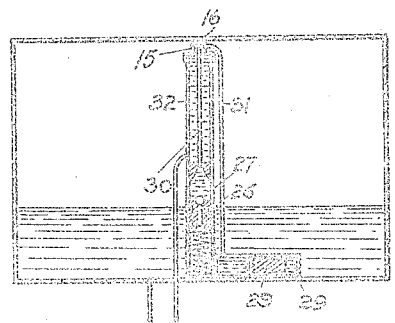

The aforesaid constructions may be combined as shown in Fig. 3, where the piston 26 oscillates in the vertical pump barrel 27, and the piston 28 moves to and fro in the horizontal pump barrel 29. The liquid is forced up through the tubes 30 and 31 resp. into the constant level chamber 32 which is provided with the cover 16 with overflow holes 15. Other variations in details of construction and arrangement will readily suggest themselves and it is to be understood that the invention, except as pointed out in the claims, is not limited to the precise construction and arrangement shown and described herein.

I claim as my invention:—

1. In an apparatus for indicating the depth or level of a liquid supply on movable vehicles or vessels, and operated through the difference in the pressures of the liquid in the supply tank and of the liquid column in an auxiliary chamber of constant level, the combination of two chambers and adapted to be filled with liquid, an elastic wall separating the chambers, an indicating mechanism arranged to be operated by the movement of the elastic wall, a supply chamber containing the liquid the level of which is to be indicated, and connected with one of said first named chambers, an auxiliary chamber in which the liquid is to be maintained at a constant level and connected with the other of said first named chambers, a pump barrel having its inlet connected to the liquid supply and its outlet connected to the auxiliary chamber, and a piston freely movable by its own inertia in said barrel.

2. In an apparatus for indicating the depth or level of a liquid supply on movable vehicles or vessels, and operated through the difference in the pressures of the liquid in the supply tank and of the liquid column in an auxiliary chamber of constant level, the combination of two chambers and adapted to be filled with liquid, an elastic wall separating the chambers, an indicating mechanism arranged to be operated by the movement of the elastic wall, a supply chamber containing the liquid, the level of which is to be indicated, and connected with one of said first named chambers, an auxiliary chamber in which the liquid is to be maintained at a constant level, and connected with the other of said first named chambers, a pump barrel having its inlet connected to the liquid supply and its outlet connected to the auxiliary chamber, and a piston freely movable by its own inertia in said barrel, the auxiliary chamber having a cover provided with openings through which the excess of liquid may return to the liquid supply.

3. In an apparatus for indicating the depth or level of a liquid supply on movable vehicles or vessels, and operated through the difference in the pressure of the liquid in the supply tank and of the liquid column in an auxiliary chamber of constant level, the combination of two chambers and adapted to be filled with liquid, an elastic wall separating the chambers, an indicating mechanism arranged to be operated by the movement of the elastic wall, a supply chamber containing the liquid the level of which is to be indicated, and connected with one of said first named chambers, an auxiliary chamber in which the liquid is to be maintained at a constant level and connected with the other of said first named chambers, a pump barrel having its inlet connected to the liquid supply and its outlet connected to the auxiliary chamber, and a piston freely movable by its own inertia in said barrel, and a spring co-operating with the piston.

CHARLES ABRAHAMS.

Witnesses:
J. STEUT,
HARRY WATKINS.